United States Patent
Park et al.

(10) Patent No.: US 6,683,438 B2
(45) Date of Patent: Jan. 27, 2004

(54) CONTACTLESS BATTERY CHARGER

(75) Inventors: Sang-Kyu Park, Kwacheon-shi (KR);
Seo-Young Park, Pyeongtaek-shi (KR);
Mae-Jin Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 10/037,615

(22) Filed: Jan. 4, 2002

(65) Prior Publication Data

US 2002/0089305 A1 Jul. 11, 2002

(30) Foreign Application Priority Data

Jan. 5, 2001 (KR) .............................. 2001-511

(51) Int. Cl.$^7$ ................................................ H02J 7/00
(52) U.S. Cl. ...................................................... 320/108
(58) Field of Search ................................. 320/108, 113, 320/114, 115, 112; 323/237, 242, 246; 363/18, 19, 97, 131

(56) References Cited

U.S. PATENT DOCUMENTS 3,609,502 A * 9/1971 Burkett et al. .............. 320/129
5,600,225 A * 2/1997 Goto .......................... 320/108
5,929,598 A * 7/1999 Nakama et al. ............. 320/107
6,252,380 B1 * 6/2001 Koenck ....................... 320/112

* cited by examiner

Primary Examiner—Pia Tibbits
(74) Attorney, Agent, or Firm—Dilworth & Barrese LLP

(57) ABSTRACT

Disclosed is a contactless battery charger that avoids contact failure between a battery pack and the battery charger including a converter and a charging unit. A converter includes a primary side of a printed circuit board (PCB) transformer. The converter converts a commercial electric power to a high-frequency square wave, applies the converted high-frequency square wave to the primary side of the PCB transformer, and controls generation of a charge current depending on charge state information provided. A charging unit includes a secondary side of the PCB transformer. The charging unit converts to a DC voltage an electromotive force induced at the secondary side of the PCB transformer by a magnetic field generated by the square wave applied to the primary side of the PCB transformer, charges a rechargeable battery with the DC voltage, and provides the charge state information to the converter.

11 Claims, 2 Drawing Sheets

CONTACTLESS BATTERY CHARGER

PRIORITY

This application claims priority to an application entitled "Contactless Battery Charger" filed in the Korean Industrial Property Office on Jan. 5, 2001 and assigned Serial No. 2001-511, the contents of which are hereby incorporated by reference.

BACKGROUND OF THE INVENTION

1. Field of the Invention

The present invention relates generally to a battery charger for use in a mobile communication terminal, and in particular, to a contactless battery charger.

2. Description of the Related Art

A mobile communication terminal such as a mobile phone, a personal digital assistant (PDA), a palm-top computer or an Internet phone, uses a rechargeable battery as an energy source. Therefore, such a mobile communication terminal requires a battery charger.

The existing battery charger for use in the palm-top computer and the mobile phone employs a contact-type charging technique, in which a battery pack gets electrical contact with the battery charger. Such a contact-type battery charger has the following disadvantages.

First, because of possible bad contact between the battery pack and the battery charger, the rechargeable battery may be insufficiently charged and may have a reduced life span. Second, when exposed to dust or moisture, the electrodes of the battery charger may get rusty, causing the bad-contact problem. Third, exposed to the exterior, the metal electrodes of the battery pack may frequently contact clothes of the user, generating static electricity, which may disrupt the operation of the communication terminal.

SUMMARY OF THE INVENTION

It is, therefore, an object of the present invention to provide a contactless battery charger, which can resolve the bad-contact problem between a battery pack and the battery charger.

To achieve the above and other objects, there is provided a contactless battery charger for use in a communication terminal including a converter and a charging unit. A converter includes a primary side of a printed circuit board (PCB) transformer. The converter converts a commercial electric power to a high-frequency square wave, applies the converted high-frequency square wave to the primary side of the PCB transformer, and controls generation of a charge current depending on charge state information provided. A charging unit includes a secondary side of the PCB transformer. The charging unit converts an electromotive force induced at the secondary side of the PCB transformer by a magnetic field generated by the square wave applied to the primary side of the PCB transformer to a DC voltage, charges a rechargeable battery with the DC voltage, and provides the charge state information to the converter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In a preferred embodiment of the present invention, a novel contactless battery charger is implemented using an ultrathin PCB (Printed Circuit Board) transformer made by disposing a transformer winding on a common PCB without using a magnetic core.

Figure 1:
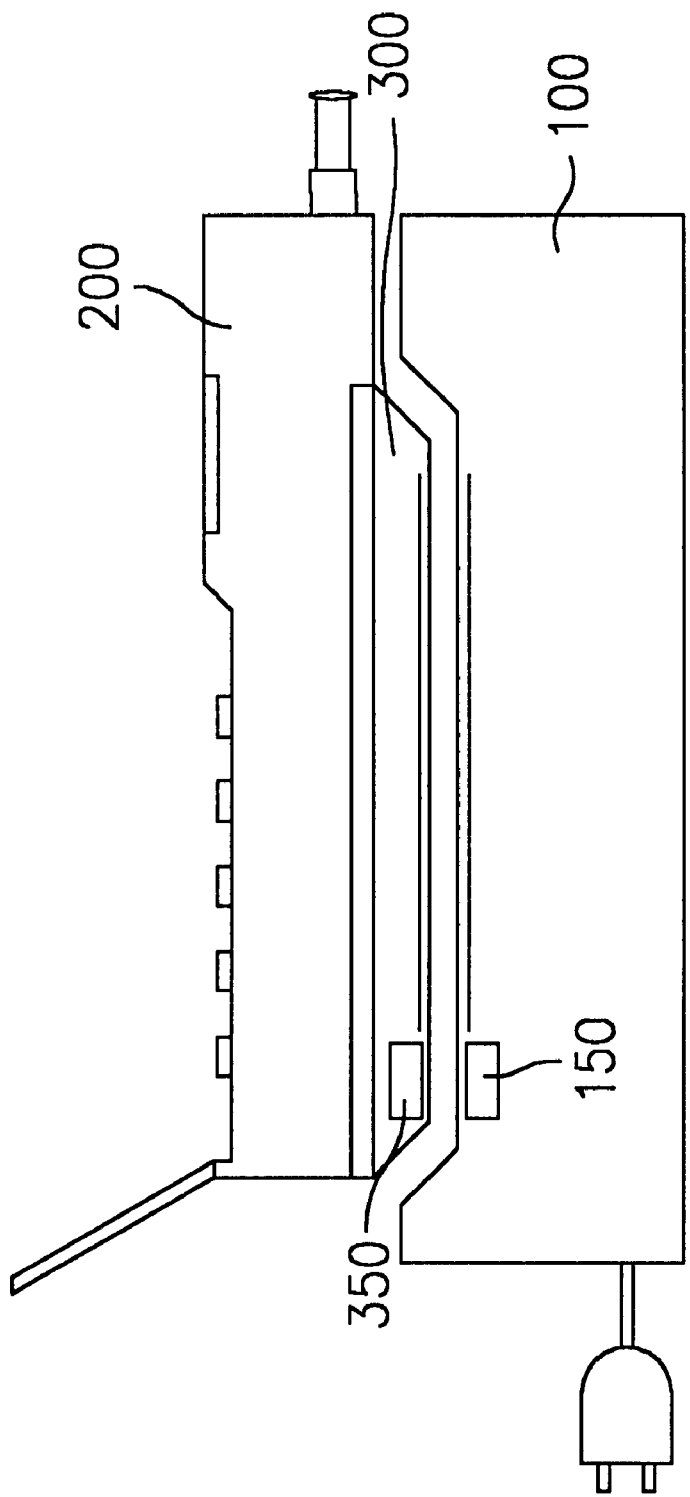
FIG. 1 is a side view illustrating a contactless battery charger for use in a mobile phone according to an embodiment of the present invention.

FIG. 1 is a side view illustrating a contactless battery charger for use in a mobile phone according to an embodiment of the present invention. Referring to FIG. 1, a primary side 150 and a secondary side 350 of a PCB transformer are spaced apart from each other in parallel so that the primary side 150 and the secondary side 350 are electromagnetically coupled to each other, thus ensuring contactless charging.

A converter 100 converts a commercial electric power to a high-frequency square wave that drives the PCB transformer. On an upper side of the converter 100 is mounted the primary side 150 of the PCB transformer such that the primary side 150 is not exposed to the exterior.

Likewise, on a lower side of a battery pack 300, which provides a charged voltage to the mobile phone as an operating voltage, is mounted the secondary side 350 of the PCB transformer such that the secondary side 350 is not exposed to the exterior. In addition, a microcircuit for charging and controlling a rechargeable battery BAT is mounted in the battery pack 300. When a mobile phone 200 mounted with the battery pack 300 is put on the converter 100, the rechargeable battery BAT in the battery pack 300 is contactlessly charged. Such a contactless battery charging method can be applied to any mobile phone regardless of its shape and size. In addition, the novel contactless battery charging method can also be applied to the PDA, the palm-top computer and the Internet phone as well as the mobile phone.

Figure 2:
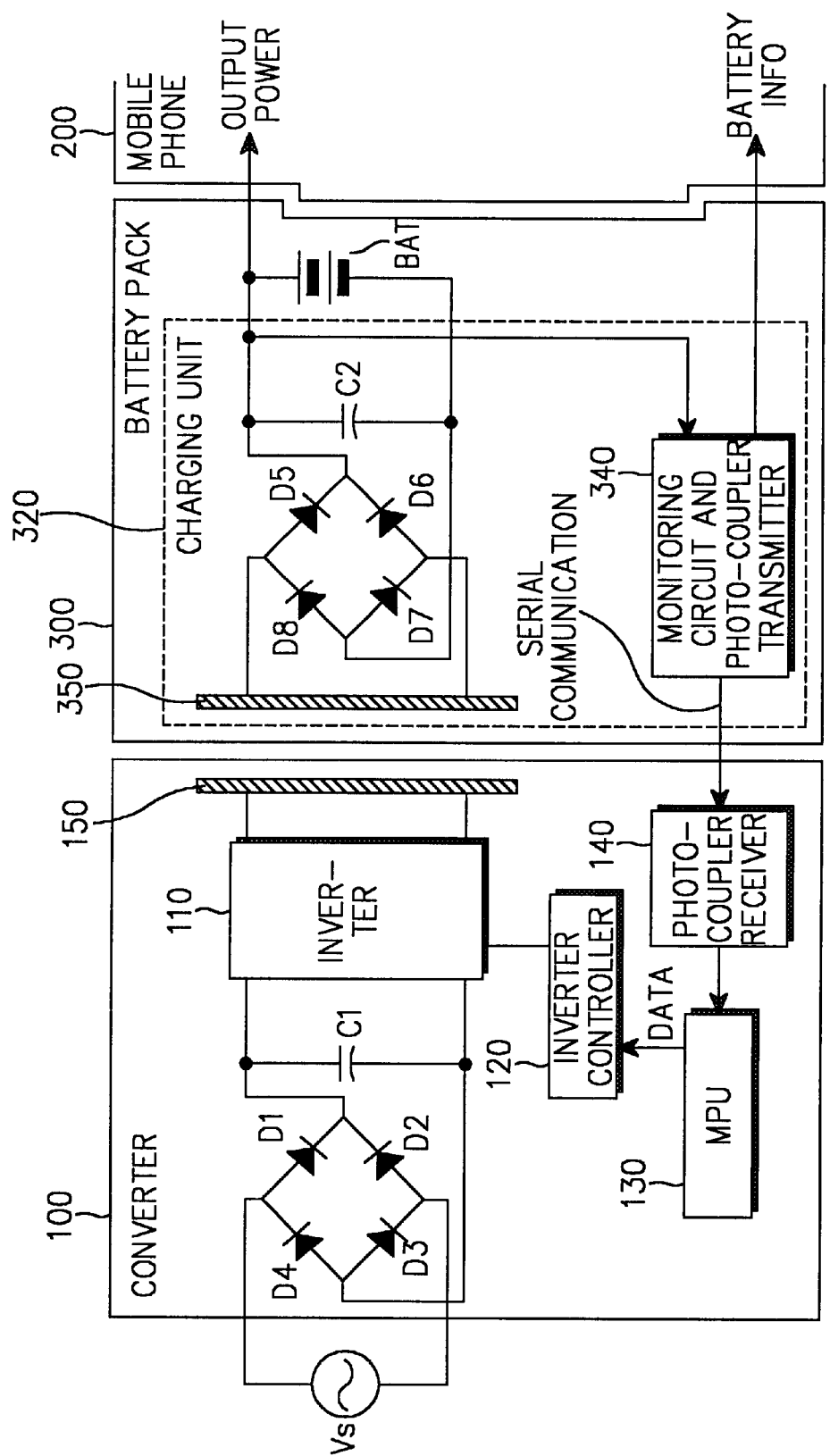
FIG. 2 is a detailed circuit diagram illustrating the contactless battery charger for use in a mobile phone according to an embodiment of the present invention.

FIG. 2 illustrates a detailed circuit diagram of the contactless battery charger for use in the mobile phone according to an embodiment of the present invention. Referring to FIG. 2, the contactless battery charger is comprised of a converter 100 with the primary side 150 of the PCB transformer, and a charging unit 320 with the secondary side 350 of the PCB transformer. The secondary side 350 of the PCB transformer is mounted on an inner surface of the battery pack 300, and the charging unit 320 is also mounted in the battery pack 300.

The converter 100 includes rectifying diodes D1–D4, an output capacitor C1, an inverter 110, an inverter controller 120, a microprocessor unit (MPU) 130, a photo-coupler receiver 140, and the primary side 150 of the PCB transformer.

Commercial electric power Vs applied to the converter 100 is converted to a DC (Direct Current) voltage by the rectifying diodes D1–D4 and the output capacitor C1, and then applied to an input port of the inverter 110. The DC voltage is converted to a high-frequency square wave by the inverter 110, and then applied to the primary side 150 of the PCB transformer. The photo-coupler receiver 140 receives a light beam radiated from a monitoring circuit and photo-coupler transmitter 340 in the charging unit 320. The microprocessor unit 130, a charging controller, recognizes specifications and a charged state of the rechargeable battery BAT based on a electric signal provided from the photo-coupler receiver 140. Further, the microprocessor unit 130 generates a charge control signal according to the recognized results. The inverter controller 120 controls the charge current by controlling a frequency of the square wave from the inverter 110 depending on the charge control signal generated from the microprocessor unit 130.

Next, regarding the converter 100, the square wave applied to the primary side 150 of the PCB transformer generates a magnetic field. The magnetic field induces an electromotive force (EMF) at a winding of the secondary side 350 of the PCB transformer in the charging unit 320. The electromotive force induced at the secondary side 350 of the PCB transformer is converted to a DC voltage by a rectifying circuit comprised of rectifying diodes D5–D8 and a capacitor C2. The monitoring circuit and photo-coupler transmitter 340 monitors a charge state of the rechargeable battery BAT and radiates a light beam according to the monitored charge state. The rechargeable battery BAT, a lithium ion battery, is charged in either a constant current mode or a constant voltage mode. For example, the rechargeable battery BAT is charged in the constant current mode from a charge start point until the battery voltage reaches a predetermined level. Once the predetermined level is reached, the rechargeable battery BAT is charged in the constant voltage mode by adjusting a flow of the charge current. That is, the monitoring circuit detects a voltage level of the rechargeable battery BAT, and provides the detected voltage level to the photo-coupler transmitter. The photo-coupler transmitter then radiates a light beam according to the detected voltage level. The radiated light beam is received at the photo-coupler receiver 140 in the converter 100.

In the embodiment of the present invention, since the inverter controller 120 controls the charge current by controlling the frequency of the square wave output from the inverter based on the charge control signal generated from the microprocessor unit 130, it is possible to implement a battery charger, which can charge every type of rechargeable battery.

For example, for a high-capacity battery, the charge current supplied to the rechargeable battery BAT is increased by increasing the frequency of the square wave applied to the primary side 150, thereby rapidly charging the rechargeable battery BAT. For the lithium ion battery, the charge current supplied to the rechargeable battery BAT is increased in the constant current mode, and then gradually decreased in the constant voltage mode, thereby improving efficiency of the battery charger.

As described above, the contactless battery charger according to an embodiment of the present invention can charge the rechargeable battery for use in the mobile communication terminal on a contactless basis, thereby preventing contact failure.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A contactless battery charger for use in a communication terminal, comprising:
    a converter including a primary side of a printed circuit board (PCB) transformer, the converter converting a commercial electric power to a high-frequency square wave, applying the converted high-frequency square wave to the primary side of the PCB transformer, and controlling generation of a charge current depending on charge state information provided; and
    a charging unit including a secondary side of the PCB transformer, the charging unit converting an electromotive force induced at the secondary side of the PCB transformer by a magnetic field generated by the square wave applied to the primary side of the PCB transformer to a DC (Direct Current) voltage, charging a rechargeable battery with the DC voltage, and providing the charge state information to the converter.

2. The contactless battery charger as claimed in claim 1, wherein the charging unit is mounted in a battery pack.

3. The contactless battery charger as claimed in claim 2, wherein the secondary side of the PCB transformer is mounted below a surface of the battery pack.

4. The contactless battery charger as claimed in claim 1, wherein the converter comprises:
    a rectifying circuit for converting the commercial electric power to a DC voltage;
    an inverter for converting the DC voltage to the high-frequency square wave and providing the converted high-frequency square wave to the primary side of the PCB transformer;
    a photo-coupler receiver for converting a received light beam to an electric signal;
    a controller for recognizing a specification and a charged state of the rechargeable battery based on the electric signal provided from the photo-coupler receiver, and generating charge control data according to the recognized results; and
    an inverter controller for controlling a charge current by controlling a frequency of the square wave output from the inverter based on the charge control data provided from the controller.

5. The contactless battery charger as claimed in claim 4, wherein the rectifying circuit comprises:
    rectifying diodes connected to the commercial electric power; and
    an output capacitor connected in parallel between the rectifying diodes and the inverter.

6. The contactless battery charger as claimed in claim 1, wherein the charging unit comprises:
    a monitoring circuit for detecting a voltage level of the rechargeable battery while the rechargeable battery is charged; and
    a photo-coupler transmitter for radiating a light beam according to the detected results.

7. The contactless battery charger as claimed in claim 1, wherein the charging unit comprises:
    a rectifying circuit for converting the electromotive force induced at the secondary side of the PCB transformer by the magnetic field generated at the primary side of the PCB transformer to the DC voltage; and
    a monitoring circuit and photo-coupler transmitter connected to the rectifying circuit and the rechargeable battery, for detecting a voltage level of the rechargeable battery while the rechargeable battery is charged, and radiating a light beam according to the detected results.

8. The contactless battery charger as claimed in claim 7, wherein the rectifying circuit comprises:
- rectifying diodes connected to the secondary side of the PCB transformer; and
- an output capacitor connected in parallel between the rectifying diodes and the inverter.

9. The contactless battery charger as claimed in claim 2, wherein the battery pack is mounted on a mobile phone and provides the charged voltage to the mobile phone as an operating voltage.

10. The contactless battery charger as claimed in claim 4, wherein the controller is a microprocessor unit.

11. A contactless battery charger comprising:
- a converter including;
  - a primary side of a PCB transformer;
  - a rectifying circuit for converting a commercial electric power to a DC voltage;
  - an inverter for converting the DC voltage to a high-frequency square wave and providing the converted high-frequency square wave to the primary side of the PCB transformer;
  - a photo-coupler receiver for converting a received light beam to an electric signal;
  - a controller for recognizing a specification and a charged state of a rechargeable battery based on the electric signal provided from the photo-coupler receiver, and generating charge control data according to the recognized results;
  - an inverter controller for controlling a charge current by controlling a frequency of the square wave output from the inverter based on the charge control data from the controller;
- a charging unit including;
  - a rectifying circuit for converting an electromotive force induced at a secondary side of the PCB transformer by a magnetic field generated at the primary side of the PCB transformer to a DC voltage; and
  - a monitoring circuit and photo-coupler transmitter connected to the rectifying circuit and the rechargeable battery, for detecting a voltage level of the rechargeable battery while the rechargeable battery is charged, and radiating a light beam according to the detected results.

* * * * *